(12) United States Patent
Shaul

(10) Patent No.: US 8,060,952 B2
(45) Date of Patent: Nov. 22, 2011

(54) ODOR REMOVAL SYSTEM AND OVERFLOW SAFETY SYSTEM FOR TOILETS

(76) Inventor: Robert Shaul, Levittown, NY (US)

( * ) Notice: Subject to any disclaimer, the term of this patent is extended or adjusted under 35 U.S.C. 154(b) by 254 days.

(21) Appl. No.: 11/523,780

(22) Filed: Sep. 19, 2006

(65) Prior Publication Data

US 2008/0066220 A1    Mar. 20, 2008

(51) Int. Cl.
*E03D 9/04* (2006.01)

(52) U.S. Cl. .......................................................... 4/216

(58) Field of Classification Search ........ 4/213, 216–217, 4/211, 348, 352, 347, 349, 427
See application file for complete search history.

(56) References Cited

U.S. PATENT DOCUMENTS

| | | | | |
|---|---|---|---|---|
| 1,061,522 A | * | 5/1913 | Bruder et al. ...................... | 4/352 |
| 1,675,841 A | * | 7/1928 | Cohoon ............................. | 4/349 |
| 2,639,440 A | * | 5/1953 | Majauskas ........................ | 4/213 |
| 2,743,462 A | * | 5/1956 | McMillan ......................... | 4/213 |
| 3,332,089 A | * | 7/1967 | Wilton .............................. | 4/213 |
| 4,044,408 A | * | 8/1977 | Pearson ............................ | 4/213 |
| 4,692,951 A | * | 9/1987 | Taki et al. ...................... | 4/213 X |
| 5,167,039 A | * | 12/1992 | Sim ................................... | 4/216 |
| 5,386,594 A | * | 2/1995 | Hilton .............................. | 4/213 |
| 5,388,280 A | * | 2/1995 | Sim ................................... | 4/213 |
| 5,704,074 A | * | 1/1998 | Baldea ............................. | 4/213 |
| 5,727,263 A | * | 3/1998 | Hugo Ceja Estrada .......... | 4/216 |
| 6,019,862 A | * | 2/2000 | Cardwell et al. ............. | 156/62.2 |
| 6,772,449 B1 | * | 8/2004 | Wolfe ............................... | 4/217 |
| 2007/0186333 A1 | * | 8/2007 | Ke et al. ........................... | 4/213 |

FOREIGN PATENT DOCUMENTS

TW    205832    * 5/1993

* cited by examiner

*Primary Examiner* — Lori Baker (74) *Attorney, Agent, or Firm* — Thomas A. O'Rourke; Bodner & O'Rourke, LLP (57) ABSTRACT

An odor removal system, in particular an odor removal system for use with flush toilets. The present invention includes an exhaust system, and a rim. The rim of the toilet is connected to the toilet vent via an outlet located on the toilet. The present invention implements an auto sensor that detects when the exhaust system is to be activated and deactivated. The exhaust system of the present invention includes an electric fan box that is connected to the vent pipe so as to remove unwanted odor from the toilet area and expel it out through the roof via the vent pipe.

2 Claims, 7 Drawing Sheets

ODOR REMOVAL SYSTEM AND OVERFLOW SAFETY SYSTEM FOR TOILETS

FIELD OF INVENTION

The present invention relates to toilet bowls, in particular to an odor removal system that implements a rim, which includes a venting means that is connected to a drain waste vent system.

BACKGROUND OF THE INVENTION

A flush toilet or water closet (hereinafter WC) is a toilet that disposes of the waste products by using water to sweep them away down a drainpipe. The water is also used as a hygienic barrier between the drainpipe and the user.

As is with many inventions, the flush toilet did not suddenly spring into existence, but was the result of a long chain of minor improvements. From as early as 2600 BC, there are remains of flushing toilets, both private and communal, from several ancient civilizations around the world. In 1596 Sir John Harrington is said to have invented a flush toilet, 'The Ajax', for Elizabeth I of England. His design was ridiculed in England, but was adopted in France under the name Angrez. The design had a flush valve to let water out of the tank, and a wash-down design to empty the bowl. In 1775 Alexander Cummings invented the S-trap (British patent no. 814), still used today, that used standing water to seal the outlet of the bowl preventing the escape of foul air from the sewer. His design had a sliding valve in the bowl outlet above the trap. In 1777 Samuel Prosser invented and patented the 'plunger closet'. In 1778 Joseph Bramah invented a hinged valve or 'crank valve' that sealed the bottom of the bowl, and a float valve system for the flush tank. His design was used mainly on boats. In 1819 Albert Giblin received British patent 4990 for the "Silent Valveless Water Waste Preventer", a siphon discharge system. In 1852 J. G. Jennings invented a wash-out design with a shallow pan emptying into an S-trap. In 1857 the first American patent for a toilet, the 'plunger closet', was granted. In the 1880s Thomas Crapper's plumbing company built flush toilets of Giblin's design. After the company received a royal warrant, Crapper's name became synonymous with flush toilets. Although not the original inventor, Crapper popularized the siphon system for emptying the tank, replacing the earlier floating valve system which was prone to leaks; the similarity between Crapper's name and the much older word crap is merely a coincidence. In 1885 Thomas Twyford built the first one-piece china toilet using the flush-out siphon design by J. G. Jennings, similar to toilets used in today's society. In 1886 an early jet flush toilet was manufactured by the Beaufort Works in Chelsea, England.

The bowl, or pan, of a flush toilet is the receptacle into which waste is excreted, usually made of vitreous china, but sometimes made of stainless steel or composite plastics. Flush toilet bowls may be pedestal (free-standing), cantilever (wall-hung) or squat in design. There are several types of pans in common use: washdown, washout and siphon are just but a few. In less common use is the valve closet.

Washdown flush toilets are the simplest in design. They take the form of a 'funnel' shape, with a broad opening at the top narrowing to a smaller outlet connected to a drain. The pan usually incorporates a water trap at the base to seal the open end of the pan from the sewer. Washdown pans have almost vertical surfaces at the back of the pan and more gently sloping fronts to allow the outlet of the pan to be directly beneath the anus of a seated user to prevent soiling of the bowl. Washout pans have a shallow pool of water into which waste is excreted. Waste is cleared from the pan by being swept over a weir and into a drain by water from the flush.

The bowl of a flush toilet is a porcelain vessel; in North America this often has a built-in siphon, usually visible as a curved pipe protruding from the back. Normally, the bowl contains a small amount of water which is enough to form an air trap inside the siphon pipe, preventing foul air escaping from the sewer. When the toilet is used, liquid flows slowly through the siphon pipe as waste matter is added, but the flow volume is too small to fill the siphon. To flush the toilet, the user activates a flushing mechanism, which pours a large quantity of water quickly into the bowl. This creates a flow large enough to fill the siphon tube, causing the bowl to empty rapidly due to the weight of liquid in the tube. The flow stops when the liquid level in the bowl drops below the first bend of the siphon, allowing air to enter which breaks the column of liquid.

The earliest type of flush toilet, the valve closet is now scarce. More complicated in design than other water closets, reliability is lower and maintenance more difficult. The most common use for valve closets is now in portable closets for caravans and camping. The valve closet has a valve or flap at the exit of the bowl with a water-tight seal to retain a pool of water in the pan. When the flush toilet is flushed, the valve is opened and the water in the pan flows rapidly out of the bowl into the drains, carrying the waste with it.

Toilet bowls of today use different types of flush mechanisms. Retrofit direct flush installation in which the flushometer has been replaced with a sensor-operated system that automatically flushes the fixture when a user departs. The system uses an infrared proximity sensor to detect a user approaching the fixture, then it waits until the user departs. A solenoid is used to actuate the flush from a 6 volt battery, or the like, inside the unit that also powers the sensor circuit.

Another type of flush mechanism is the flushometer, or more commonly known as 'direct flush'. In the old-style manual flush systems, the user presses a button, which opens a flush valve allowing mains-pressure water to flow into the bowl, or sometimes the user presses directly on a flush lever (a handle connected directly to a flushometer). The valve contains a pneumatic mechanism that closes it after a preset time. This system requires no storage tank, but requires high volume water for a very brief time period. Thus a ¾ inch (19 mm) pipe at minimum, and preferably a 1 inch (25 mm) pipe, but the high volume is used only for a short duration so very little water is used for the amount of flushing efficacy delivered. Direct valves are regulated by a device called a "flushometer" that meters out a certain controlled amount of water per flush. Direct flush makes the most efficient use of water, because it uses the water at full pressure and volume. The ability of water to perform the work in removing waste matter from the toilet bowl is given by pressure multiplied by volume. Typical pressure in an urban commercial building where flushometers are usually used is around 60 pounds per square inch (400 kPa) which is enough pressure to raise the water 137 feet (42 m) above the toilet bowl. Thus, in some sense, the effectiveness of direct flush is like having the tank 137 feet (42 m) above the bowl (lots of "flush energy").

Flushometer type toilets are much more common in commercial installations (at least in the US); they're almost never seen in residential installations, except for dormitory and barracks areas. The installation of large numbers of toilets in buildings like sports stadiums has led to a test which is commonly performed before the final release of such a project, which is called "The Flush". It entails stationing individuals in each restroom in the facility—in large installations this can amount to 100-400 people—and cueing them all by radio to flush their toilets as close to simultaneously as possible. The purpose of the test is twofold: it checks that the plumbing design engineers got their sums right on the sizes of both the main water supply to the building, and also the size of the drain piping. The test is commonly not made public before it happens, so as to avoid embarrassment if fails.

Still another type of flush mechanism is the valve tank type. A storage tank, or cistern, collects between 6 and 9 litres of water over a period of time. This system is suitable for locations plumbed with smaller diameter pipes. The storage tank is kept full by a float valve or ball cock. An outlet in the bottom of the tank is covered by a buoyant plastic cover (the flush valve) which is held in place by water pressure. To flush the toilet, the user pushes a lever, which lifts the flush valve from the outlet. The valve then floats clear of the outlet, allowing the tank to empty quickly into the bowl. As the water level drops, the floating flush valve descends back to the bottom of the tank and covers the outlet pipe again; this system is common in the USA. Tank type toilets waste the energy in the water by converting the potential energy of 137 feet (42 m) (the "head" of pressure in typical city water mains) times acceleration due to gravity, into around 18 inches (460 mm) above the bowl. Some older style toilets mitigate this waste of energy to some degree by having the tank be as high as possible (up near the bathroom ceiling), but modern tank type toilets waste the energy in the water, and therefore either use more water than necessary for a given flushing job, or for the same amount of water, flush less effectively than direct flush.

The valveless siphon tank type, this system, invented by Albert Giblin and common in the UK, uses a storage tank similar to that used in the flush valve system above. The user pushes a lever or button, forcing the water up into a siphon (not to be confused with the bowl siphon) which empties the entire tank into the bowl. The advantage of a siphon over the flush valve is that is has no sealing washers that can wear out and cause leaks, so it is favoured in places where there is a need to conserve water. Until recently the use of siphon-type cisterns was mandatory in the UK to avoid the potential waste of water by millions of leaking toilets. Older installations used a high-level cistern, or high suite, fitted above head height, that was operated by pulling a chain hanging down from a lever attached to the cistern. Some people still refer to the act of flushing a toilet (even a new low-cistern, or low suite, type) as "pulling the chain" or "flushing the chain". Modern versions have a neater-looking low-level cistern with a lever that the user can reach directly, or a 'close-coupled' cistern that is even lower down and integrated with the bowl. This lower level results in loss of potential energy in the water, as the potential energy of water pressure is converted to the potential energy of height in a less advantageous manner, due to very little height, as described above.

Another type of toilet flush mechanism is the "pressure assist", not uncommon in the United States, this system (invented by Bruce Martin) uses the water pressure within a structure to compress air within a closed vessel located within the vitreous enclosure. When flushed, the compressed air pushes into the bowl at a velocity (flow rate in gallons per minute or liters per second) significantly higher than gravity flow. This system is more water efficient than a tank type and can be installed into the same fittings as the latter. However it costs 10% less than the new 3" (75 mm) gravity flapper equipped tank-type toilets. Pressure assist toilets are used in both private [single and multiple and lodging] bathrooms as well as light commercial installations [offices, etc.] They hardly ever clog and so require less maintenance.

"Automatic flush" refers to a triggering mechanism, rather than a water propulsion mechanism, although is usually implemented together with direct flush systems. Auto flush systems, as the name suggests, flush automatically once the user has left. Typically, an override button is provided if the user wishes to trigger flushing earlier. In retrofit installations a flushometer can be replaced with a self-contained battery operated machine vision system that actuates a solenoid when a user departs. There are two main kinds of machine vision systems used for sensor operated flush: passive; and active. Passive systems, such as Passive infrared (PIR), see the body of the user by electromagnetic energy that is received by the sensor. Active vision systems provide a source of electromagnetic energy (radar, infrared, or the like) and see reflected energy from the target (e.g. the user of the fixture). Automatic flushing cisterns may also be of the siphonic pattern, where a siphon is activated once water fills the tank and begins to run through the siphon tube.

Toilets are used in almost all civilized countries in the world. One country that has excelled in toilet development is Japan. The Japanese have some of the most advanced toilet systems in the modern world. The toilets used in Japan can do almost everything except cook. Western-style toilets and urinals started to appear in Japan at the beginning of the 20th century, but only after World War II did their use become more widespread, due to the influence of the American occupation. In 1977, the sale of Western-style toilets exceeded the sale of traditional squat toilets in Japan. Based on toilets with a built-in bidet from Switzerland and the U.S., the world's largest sanitary equipment company, TOTO, introduced the Washlet in 1980. Japanese companies currently produce some of the most advanced, high-tech toilets in the world, as evidenced by a high-end wireless toilet control panel with 38 buttons.

The standard flush toilet used worldwide is known in Japan as a Western-style toilet. Western-style toilets, including high tech toilets, are now more common in Japanese homes than the traditional squat toilets, though some older apartments retain stickers on the toilet or in its room illustrating the proper way to use it for urination and defecation. While most public facilities such as schools, temples, and train stations are often equipped with only squat toilets, in their own homes, Japanese people prefer being able to sit, especially older individuals for whom prolonged squatting is physically demanding or uncomfortable.

The modern toilet in Japan, commonly known in Japanese as Washlet or as warm-water cleaning toilet seat is likely the most advanced type of toilet worldwide, showing a dazzling array of features. The TOTO product Washlet Zoe is listed in the Guinness Book of Records as the world's most sophisticated toilet with seven functions. However, as the model was introduced in 1997, it is now likely to be inferior to the latest model by Toto Neorest. As of 2002, almost half of all private homes in Japan have washlet style toilets, exceeding the number of households with a personal computer. While the toilet looks like a Western-style toilet at first glance, there are a number of additional features, such as blow dryer, seat heating, massage options, water jet adjustments, automatic lid opening, flushing after use, wireless control panels, heating and air conditioning for the room, et cetera, included either as part of the toilet or in the seat. These features can be accessed by a control panel that is either attached to one side of the seat or on a wall nearby, often transmitting the commands wirelessly to the toilet seat.

The most basic feature is the integrated bidet, a nozzle the size of a pencil that comes out from underneath the toilet seat and squirts water. It has two settings: one for the anus and one for the vulva. The former is called posterior wash, general use, or family cleaning, and the latter is known as feminine cleaning or feminine wash. At no point does the nozzle actually touch the body of the user. The nozzle is also self-cleaning and cleans itself before and after operation. The user can select to wash the anus or vulva by pressing the corresponding button on the control panel. Usually the same nozzle is used for both operations, but at a different position of the nozzle head, and using different openings in the nozzle to squirt water at a different angle to aim for the correct spot. Occasionally, two nozzles are used, each dedicated for one area. The control logic is also attached to a pressure switch in the toilet seat, and operates only if there is pressure on the seat, indicating that the seat is occupied. The very first models did not include this automatic switch-off. The pressure switch was added to avoid accidental use without a user sitting on the toilet.

The Apricot washer, one of the most high-tech toilets also provides the option to select the water pressure to adjust to the preferences of the user. By default, the vulva receives less pressure than the anus. Usually, the temperature of the water can also be adjusted. Researchers in Japan have found that a water temperature slightly higher than the body temperature is preferred by most customers, and 38° C. is considered best. The exact nozzle position can also often be adjusted forward or aft manually. High-end washlets also provide options for a vibrating and pulsating jet of water. The most advanced washlets can even mix the water jet with soap for an improved cleaning process.

The washlet can replace toilet paper completely, but many users opt to improve the hygiene in combination with the mechanical action of the toilet paper. This also depends on the cleaned region, and the cleaning of the vulva may not need toilet paper. Some people use toilet paper before washing, some after washing, some use only the bidet and others do not use the bidet at all and prefer to use toilet paper.

A second commonly found feature is a blow drier, often adjustable between 40° C. and 60° C. to dry the private regions after cleaning with the integrated bidet. Other features may include a heated seat, which may be adjustable from 30° C. to 40° C.; an automatic lid equipped with a proximity sensor, which opens and closes based on the location of the user; automatic flushing; automatic air deodorizing; and a germ-resistant surface. Some models specially designed for the elderly may include arm rests and devices that help the user to stand up after use. A soft close feature slows the toilet lid down while closing so the lid does not slam onto the seat, or in some models, the toilet lid will close automatically a certain time after flushing. The most recent introduction is the ozone deodorant system that can quickly eliminate the smell of waste. Also, the latest models store the times of the use of the toilet, and have a power saving mode that heats up the toilet seat only during times when the toilet is likely to be used based on the collected usage data. Some toilets also glow in the dark or may even have air conditioning for hot summer days. Another recent innovation is intelligent sensors that detect someone standing before the toilet and automatically raise the lid (if the person is facing away from the toilet) or the lid and seat together (if someone is facing the toilet).

Recently, researchers have added medical sensors into these toilets, which can measure the blood sugar based on the urine, and also measure the pulse, blood pressure, and the body fat content of the user. Other measurements are currently being researched. This data may automatically be sent to a doctor through a built-in internet-capable cellular telephone. However, these devices are still very rare in Japan, and their future commercial success is difficult to predict. A voice-operated toilet that understands verbal commands is under development.

TOTO is the largest producer of toilets, including washlets worldwide. Washlets and other toilet related products are also produced by Inax, NAIS, and Panasonic. The total market worldwide for high-tech toilets was about US$800 million in 1997. In the U.S. for example, sales are well below Japanese levels, even though the sales improved from 600 units per month in 2001 to 1000 units per month in 2003. In Europe, Toto sells only 5000 washlets annually. While most Europeans would probably regard the Japanese washlets as quite a curiosity, the number of such toilets being installed in Europe is actually on the rise. This is mainly for the special purpose of toilets for the handicapped. Depending on the type of disability, handicapped persons may have difficulties reaching their anus regions in order to clean themselves after toilet use. Hence, the introduction of toilets with a water jet cleaner and blow dryer saves these persons from the embarrassing need to ask somebody else for assistance with an inherently private procedure.

Another country that has Hi-Tech toilets is Switzerland. Switzerland actually has its own producer of shower toilets, with a history predating the washlet in Japan. Trade names are Geberit-O-Mat and Geberella, produced by Balena. These toilets are sold primarily for hospitals, private homes, and a few high-level restaurants, and may include similar features as the Japanese products. Although there are many advanced toilets being produced in the world today, there are non that have the unique odor removal system as in the present invention.

OBJECTS OF INVENTION

It is therefore an object of the present invention to produce a flush toilet that is cost effective to manufacture.

It is an object of the present invention to produce a flush toilet, which is simple in construction and reliable in construction.

It is an object of this invention to produce a flush toilet that removes unpleasant odors from the toilet area, during and after use.

It is still another object of the present invention to produce a flush toilet that can reduce the amount of fluorocarbons and other harmful gases from the atmosphere.

It is still a further object of the present invention to provide a flush toilet that is extremely simple to operate.

It is another object of the present invention to produce a flush toilet that implements an automatic flush system via a red light sensor.

These and other objects of the present invention will become apparent to those skilled in the art from a review from the description provided below.

SUMMARY OF INVENTION

The present invention relates to a flush toilet, in particular a flush toilet that removes unwanted odors from the toilet area, i.e. fecal, regurgitation and the like. The present invention includes a base, seat, tank, lid, and exhaust system. Located on the seat of the toilet may be a rim. The rim of the present invention may have a first area wherein there may be vent apertures and a second area wherein there may be a plurality of apertures for introducing water into the toilet bowl. The area used for removing unwanted odor is connected to the vent pipe of the toilet. In addition, there is a fan box concealed in the wall that makes up the exhaust system, which produces the vacuum that sucks the unwanted odor from the toilet. The fan box may be hardwired with electric from the existing electric panel, or the fan box may be battery operated. The present invention may also include a detection device, which may be used for automatic ventilation, and/or flushing. One type of detection device, commonly used in the art, is a Sloan red-eye sensor.

There are already known ventilated toilets that are equipped with a blower arrangement at the toilet bowl, which may, extract unwanted air or introduce wanted warm air

DESCRIPTION OF THE RELATED ART

U.S. Pat. No. 3,763,505 issued on Oct. 9, 1973, to Joseph P. Zimmerman describes two embodiments of a toilet ventilation device comprising, in a first embodiment, a ventilator casing having a bottom hole resting on top of the flush tank and containing charcoal filters, a battery driven fan and a timer switch to exhaust the odor via the water feeding holes in the toilet bowl rim. In another embodiment, the ventilator casing rests on the floor, and a perforated ring or partial ring manifold under the toilet seat exhausts the noxious gas. The devices are distinguishable for requiring the ventilator casing adjacent the toilet bowl, and the odor is removed via the water feeding holes.

U.S. Pat. No. 6,052,837 issued on Apr. 25, 2000, to John A. Norton et al. describes a toilet ventilation system that moves air from within a toilet bowl and through a filter, or alternately, out of the building by an exhaust pipe. A seat assembly has an air channel defined by the lower surface of the seat. An air channel cover is removably held in place on the lower surface of the toilet covering the air channel. A bow-mounted base and enclosure is attached to the toilet bowl by standard mounting bolts. The seat and lid are pivotally carried by the bowl-mounted base. A reservoir with a drain opening prevents the passage of liquid into a fan and filter housing that is carried by the base and contains a fan powered by a direct current electrical system and an activated charcoal filter. The system is distinguishable for requiring the air filter and fan adjacent to the toilet bowl.

U.S. Pat. No. 5,819,324 issued on Oct. 13, 1998, to Ronnie D. Bianco describes a toilet ventilating device comprising a base mounted on the rim portion of a toilet bowl, and having a C-shaped vacuum member having a plurality of apertures superimposed on the inner periphery of the base. The vacuum member has a hollow handle and is connected to an exhaust hose and exhaust fan outside the room. The device is distinguishable for requiring a C-shaped exhaust member coupled to an external handle and a flexible hose.

U.S. Pat. No. 5,161,262 issued on Nov. 10, 1992, to Edwin G. Quaintance, Sr. describes an adjustable housing with two sections having neck portions for telescoping one section into the other section. Each section defines a wide, thin air inlet disposed adjacent the toilet bowl rim. In one section a battery pack, a timer circuit and on-off switches are included. The other section includes an activated charcoal filter and fan to draw foul air from both air inlets and returning the air to the ambient. The telescoping neck portions include a pair of sliding electric contacts to provide electricity to the fan motor. The apparatus is distinguishable for requiring a limited adjustable housing, a neck portion with a pair of electric contacts, and exhausting the deodorized air into the ambient by the toilet bowl.

U.S. Pat. No. 1,342,716 issued on Jun. 8, 1920, to Edwin A. Johnston describes a toilet closet ventilator system comprising an exhaust motor and fan mounted in a pipe passing through the closet top and extending into the water and covering the overflow pipe. A switch box located below the closet or flush tank is actuated by a plunger connection to an arm from the pivot pin of the seat. The closet ventilator system is distinguishable for requiring a motor and exhaust fan adjacent the closet, and a switch box below the closet.

U.S. Pat. No. 2,105,794 issued on Jan. 18, 1938, to Charles C. Norris describes a combination closet tank cover and ventilator system comprising a blower unit integrated on top of the closet tank and having a circular fan to exhaust through a wall. The system is distinguishable for requiring the fan on top of the closet tank.

U.S. Pat. No. 2,279,789 issued on Apr. 14, 1942, to Henry Jentzer describes a toilet bowl ventilator system comprising an oval motor and fan in the vertical atmosphere vent pipe attached to the double elbow section fitting inside a semispherical cup of a water discharge (flush) pipe. The toilet seat has a switch underneath connected to house current, and activated by the weight of the user. The system is distinguishable for requiring a seat switch and a motor in the vertical air exhaust pipe.

U.S. Pat. No. 2,985,890 issued on May 30, 1961, to Harry Baither describes a toilet bowl ventilating apparatus comprising a water trap inside the flush tank, and a suction fan and motor housed in a casing secured to the rear wall of the flush tank. The apparatus is distinguishable for requiring the fan inside the flush tank.

U.S. Pat. No. 3,192,539 issued on Jul. 6, 1965, to William L. Martz describes ventilators for water closets, kitchens and the like. The ventilating-pipe extends from the overflow pipe inside the water closet to a vertical pipe having an exhaust fan in the attic to exit at the roof. The system is distinguishable for requiring a direct conduit from the overflow pipe to the roof.

In addition, to the obvious distinctions mentioned above none of the prior art cited implements a double rim. None of the above inventions and patents, taken either singly or in combination, is seen to describe the instant invention as claimed.

As mentioned previously, toilets have developed over the years, and from the sales data noted above, toilets are a big business, as seen with the "Washlet" owned by TOTO. However, with all the Hi-Tech features of the TOTO, their flush toilet does not extract the unwanted odor form the toilet area. In addition, the Washlet, by TOTO, introduces deodorizes into the air to mask the unpleasant odor. This has a two-fold effect, one it introduces harmful gases in the air, which adds to the increasing Greenhouse effect. Secondly, with this prior art, one has to refill the deodorizer which is burdensome to say the least. As mentioned above the present invention solves the problem of unwanted odor by implementing a double rim.

The related art of interest describes various toilet bowl odor eliminators, but none discloses the present invention that is simple, economical and effective in quickly removing the odor issuing from the toilet bowl while in use for fecal odor elimination.

BRIEF DESCRIPTION OF INVENTION

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
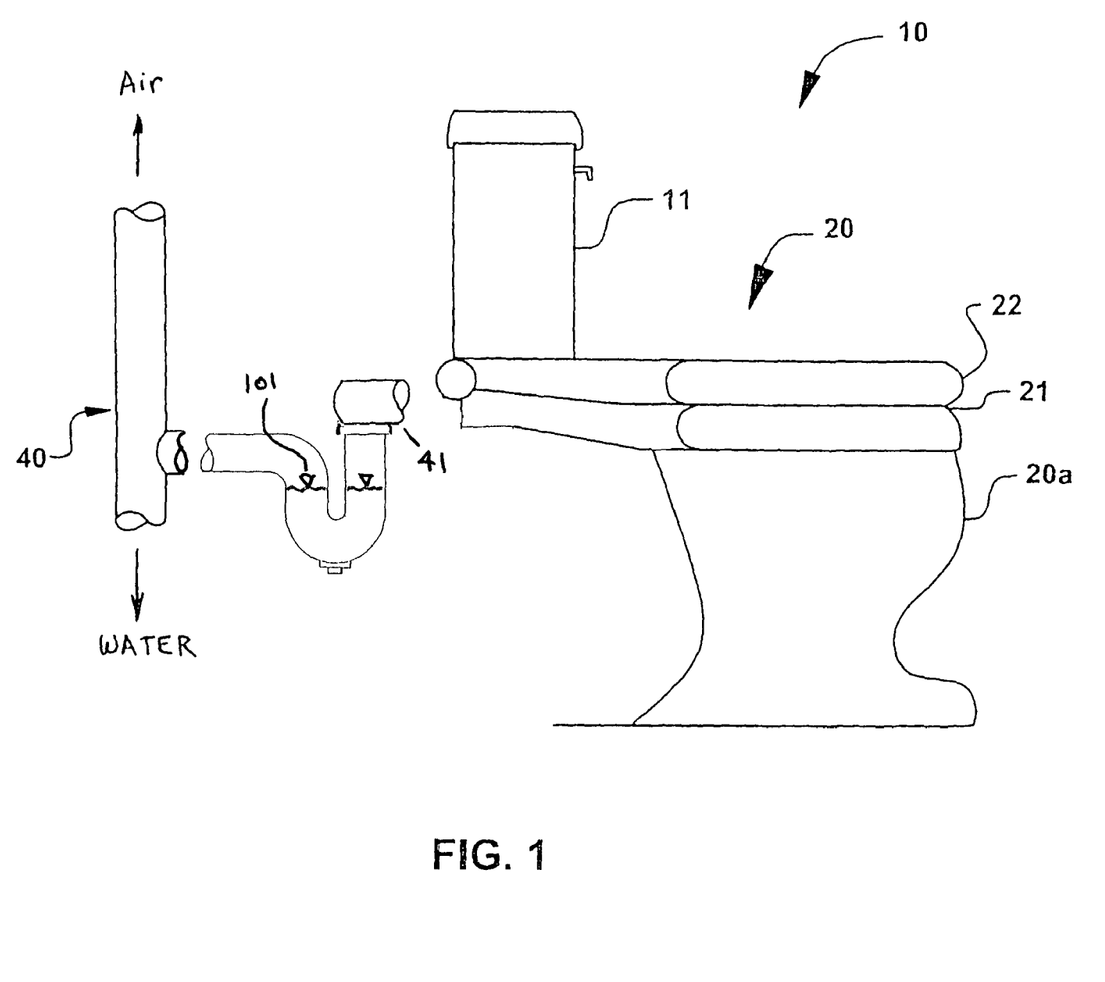
FIG. 1 is a side view of the flush toilet odor eliminator.
Figure 2:
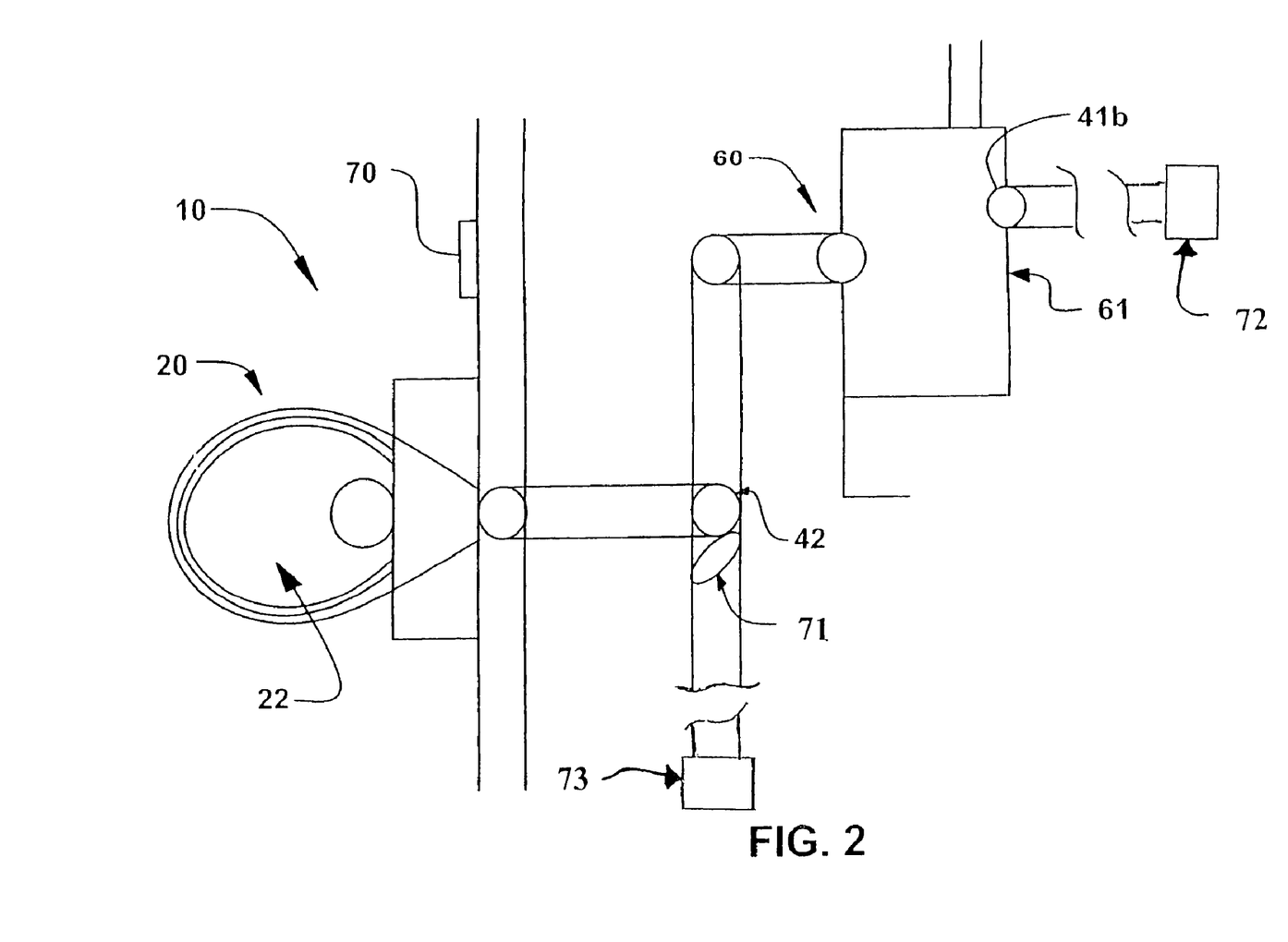
FIG. 2 is an expanded view of the flush toilet odor eliminator.

Drawing one's attention to FIGS. 1 and 2 is the flush toilet odor eliminator system 10. The present invention includes a toilet bowl 20 with a rim 21, an exhaust system 60, and a vent pipe 40, which may include a reed or spring valve.

Figure 3:
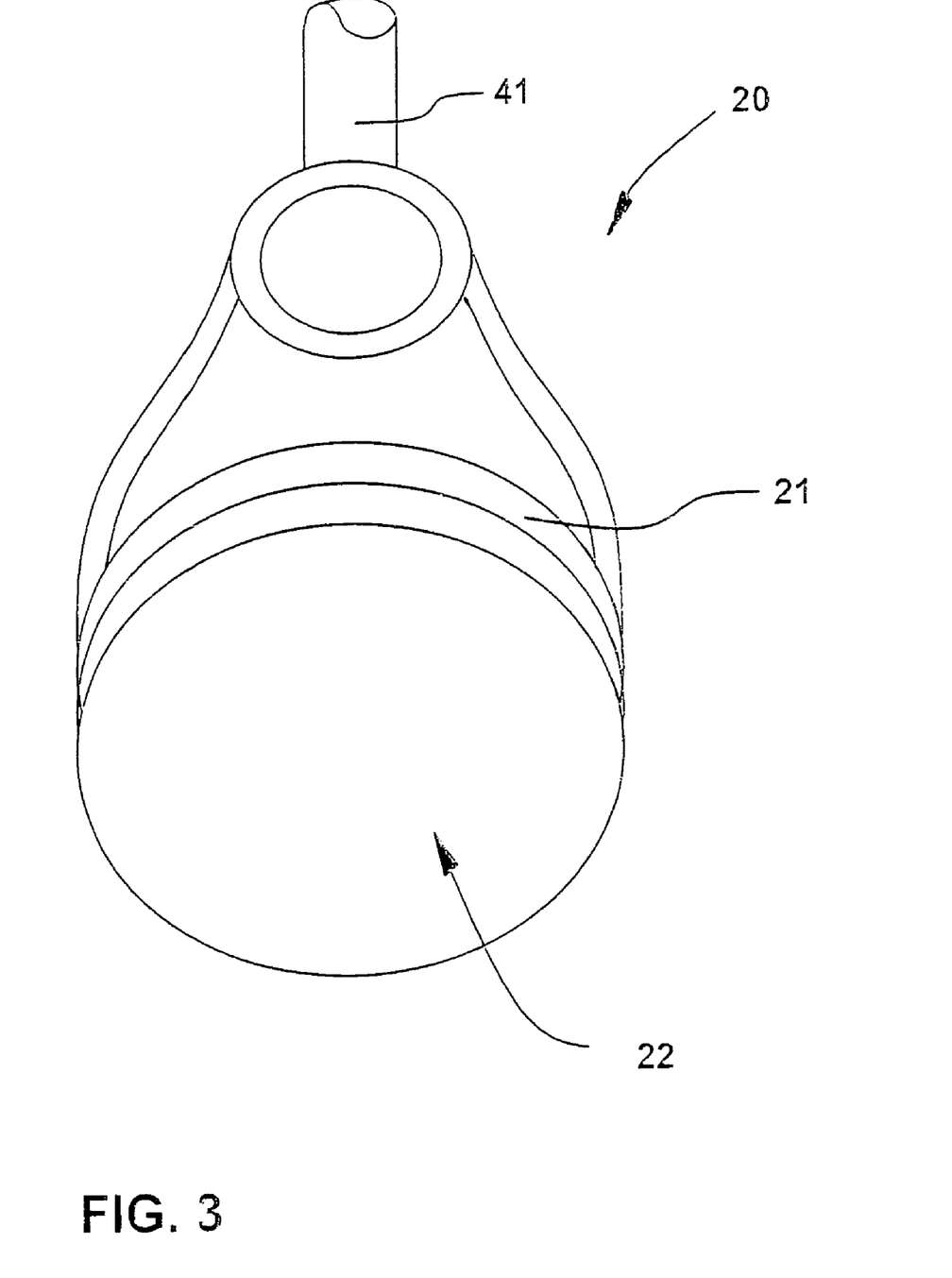
FIG. 3 is a perspective view of the toilet bowl of the present invention.
Figures 4, 4A:
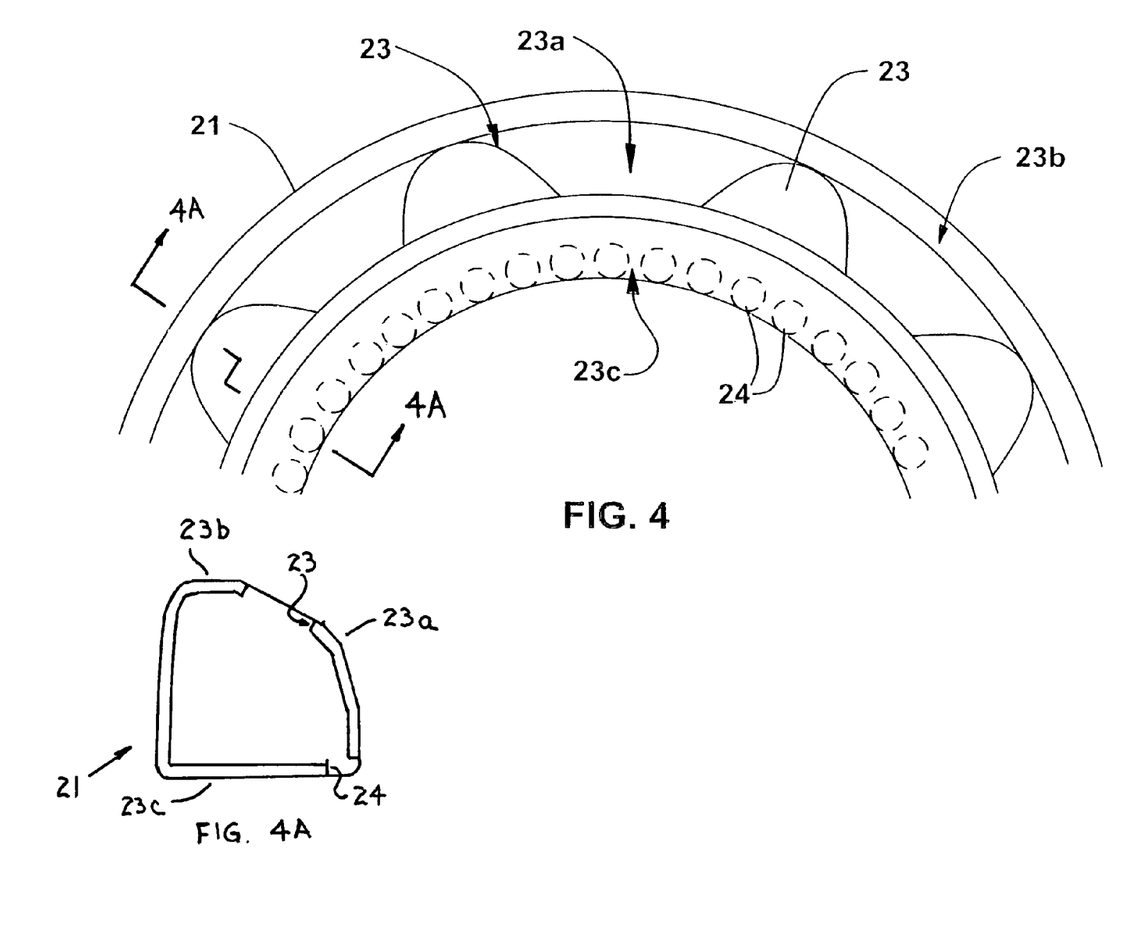
FIG. 4 is a top view of the rim of the present invention with the vent apertures located on an inside side surface of the rim.
FIG. 4A is a section cut through the rim of FIG. 4.

Turning one's attention to FIG. 1, tank 11 is of generally conventional construction, and is provided with the essential members for normal operation. That is to say tank 11 includes a bulb valve, overflow pipe, inlet supply pipe, an external lever, and the like, not shown. The key feature of the present invention, rim 21, is located on the bowl portion 20a. Rim 21 has a generally circumferential surface that conforms to the shape of seat 22 of toilet bowl 20, as seen in FIGS. 1, 2, 3 and 4. Turning one's attention again to FIG. 1, rim 21 may be integrally formed with the base of bowl 20a. As mentioned previously the present invention implements a rim 21. In the preferred embodiment one may have vent apertures 23 on a side surface 23a of rim 21, as seen in FIG. 4.

Figure 5:
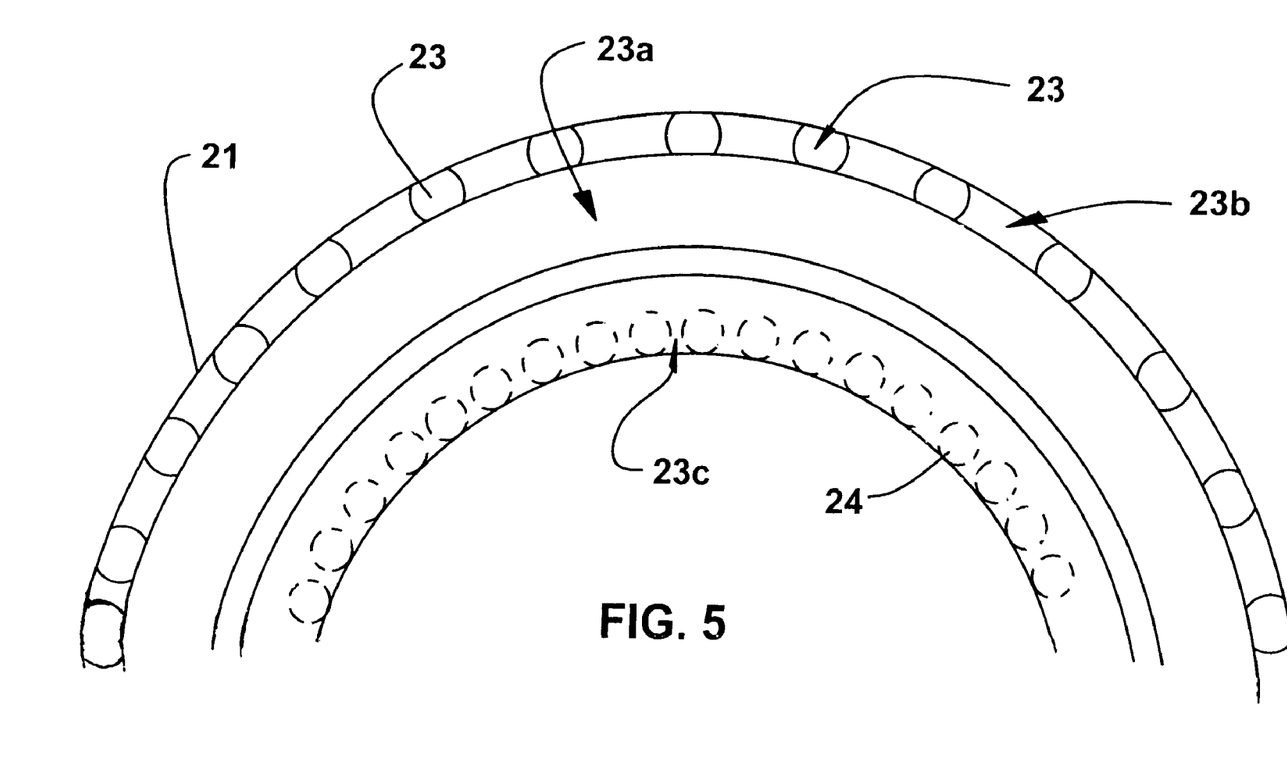
FIG. 5 is a top view of the rim of the present invention with the vent apertures located on a top surface of the rim.
Figure 6:
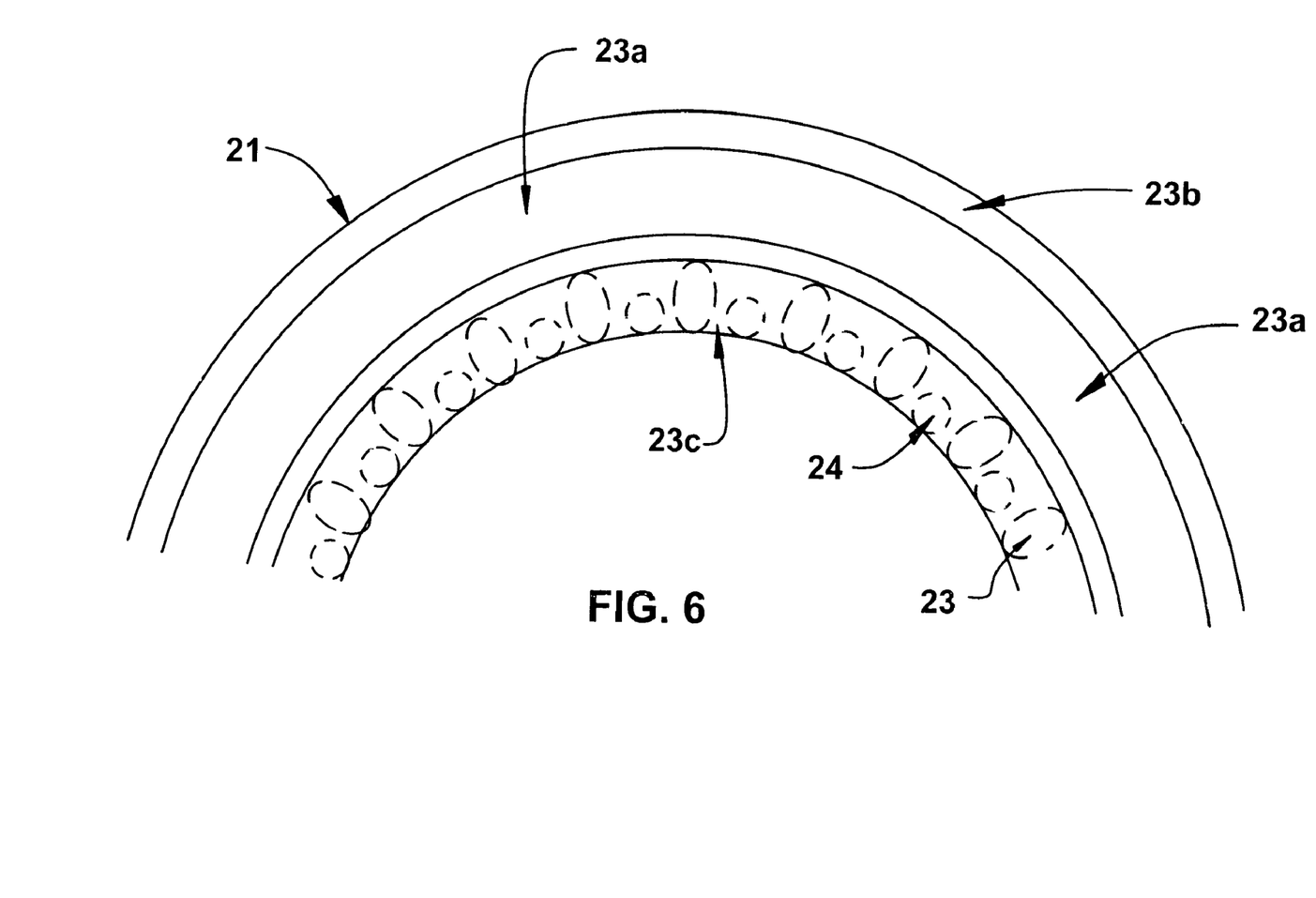
FIG. 6 is a top view of the rim of the present invention with the vent apertures located on a bottom surface of the rim adjacent to the water flow apertures.

In another embodiment vent apertures 23 may be located on a top surface 23b of rim 21, as seen in FIG. 5. In yet another embodiment there can be vent apertures 23 located on a bottom surface 23c of rim 21 adjacent to water flow apertures 24, as seen in FIG. 6. In addition, rim 21 may have one or a plurality of water flow apertures 24, and one or a plurality of vent apertures 23, this would depend on the individual user's desire. In the preferred embodiment there a plurality of water flow apertures 24, as seen in FIGS. 4, 5 and 6, and a plurality of vent apertures 23. The amount of apertures for either rim will depend on the needs of the individual user. In addition, vent apertures 23 and waterflow apertures 24 may be of different dimensions, and this too will depend on the individual user's desires. The shapes of vent apertures 23 and water in apertures 24 may be any suitable shape known in the art including, but not limited to, square, round, oval and the like. In the preferred embodiment one implemented generally circular apertures. In normal operation these apertures will allow water to flow in when the user flushes the toilet, and unwanted air to be extracted out when the vent is activated. In addition, vent apertures 23 may also serve as an overflow safety means. For example, if after use, when the user flushes the bowl, a backup develops, vent apertures 23 will allow the ascending water to drain, rather then flow over the edge of the toilet. With this embodiment the user would deactivate the valve so that the overflowing water may drain into the vent pipe.

Figure 7:
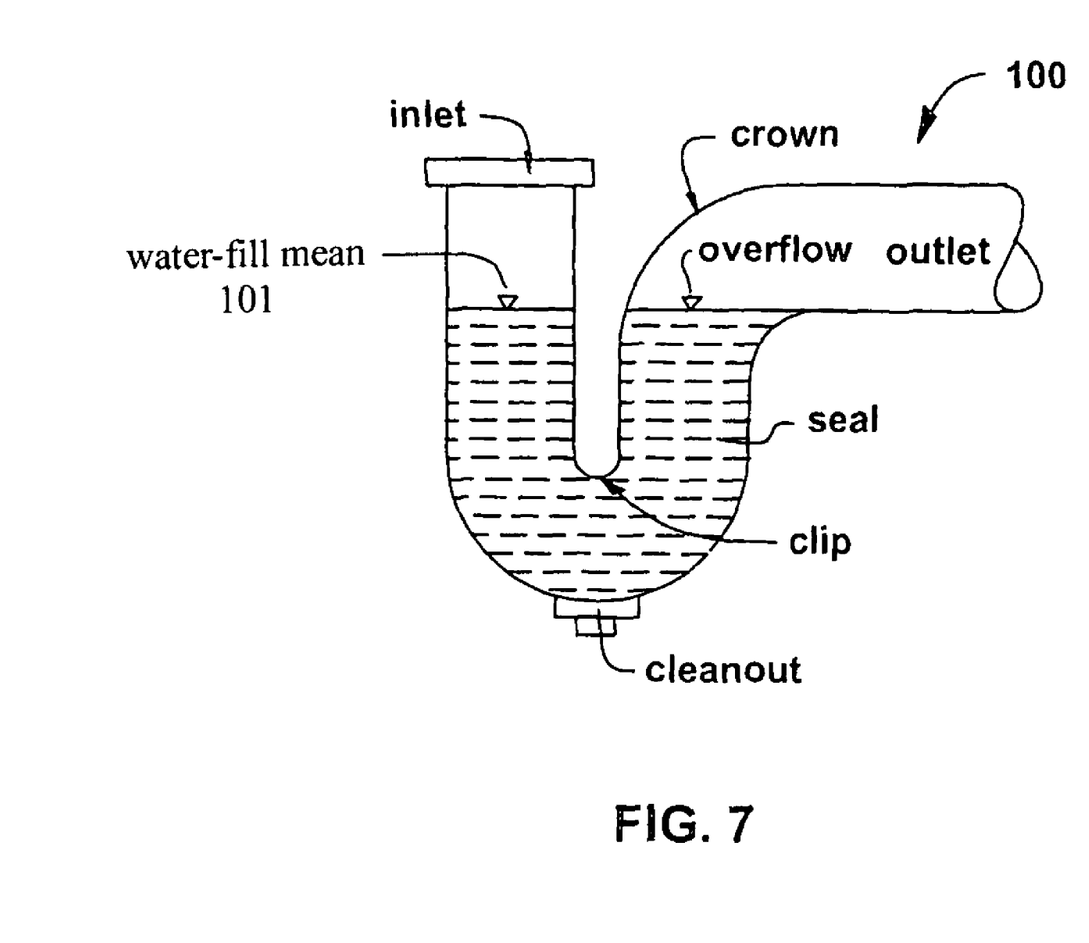
FIG. 7 is a side view of a prior art "P-Trap".

In many residential homes today most toilet fixtures are vented through the roof, through a vent pipe, this allows for proper water flow. In addition, in a majority, if not all modern residential and commercial structures, the venting systems have many apparatus 72 attached to them. For example, one can have two toilets, a bath tub and a washing machine all connected to a vent line. In the present invention rim 21 has an outlet 41 that is connected to vent pipe 40, as seen in FIGS. 1, 2 and 3. In addition, located between outlet 41 and vent 40 there can be a dedicated "P-Trap" 100, as seen in FIG. 7. P-Trap 100 can be any suitable type of P-trap known in the available market. Generally, vent pipe 40 will be located inside of the bathroom wall, and will extend in a generally vertical direction toward and through the roof. As mentioned previously, vent pipe 40 operates so as to allow the water to flow at a steady rate, without any gurgling. In most homes the vent pipe is teed off the waste pipe, as depicted in FIG. 2. The present invention implements an exhaust system 60, which may be used with a vent line that has one toilet 20, or many additional toilet fixtures 73 attached to it. Exhaust system 60 may be any suitable exhaust system known in the art. In the preferred embodiment one implemented a fan box 61, also seen in FIG. 2. Fan box 61 may be hardwired into the electrical system of the house, or fan box 61 may be battery operated. In another embodiment one may have a solar powered fan box. In the latter, the fan box would be connected on the outside of the roof Fan box 61 may be located at different heights along vent pipe 40. Also, fan box 61 can have an access door or panel located on one of its outside walls. In the preferred embodiment one affixed fan box 61 at a position 48" above the center line of outlet 41 of rim 21. Fan box 61 may have a variety of power ratings, this will depend on the individual's needs. Also, Fan box 61 may have multiple apertures to allow for intake and exhaust of noxious gases, as seen in FIG. 2. Fan box 61 of exhaust system 60 may be activated by any suitable means known in the art including, but not limited to a switch, or an electronic auto sensor. In the preferred embodiment one implemented the later. In the preferred embodiment one implemented an auto sensor that was activated when the user contacted the top surface 23b of rim 23. In other embodiments implementing an auto sensor, one could have the auto sensor activate for different conditions, or any combination thereof. For example one could have the auto sensor activate if the flush toilet cover is elevated and one sat on the bowl, or if one were to stand next to bowl. In the preferred embodiment one implemented a Sloan red-eye auto sensor 70. The Sloan red-eye sensor may be located in a plethora of different locations. In a preferred embodiment sensor 70 can be located on a nearby wall, as seen in FIG. 2.

In addition to exhaust system 60, vent pipe 40 may have a variety of different spring or reed valves 71, string valve flaps 42, and the like located thereto, as seen in FIG. 2. In a preferred embodiment a reed valve 71 was used.

In an alternative embodiment, there can be a dedicated P-trap 100. In this embodiment P-trap 100 can be positioned between outlet 41 and vent pipe 40. In addition, P-trap 100 can be located behind, inside, or below the wall of the bathroom. In a preferred embodiment P-trap 100 can have a self regulating water fill means 101.

In normal operation when the user sits on or stands near the toilet flush seat cover, auto sensor 70 will activate the exhaust system. At this time reed valve 71 and all other valves will close, thus isolating the vent pipe from the rest of the venting pipes. It should pointed out, that if the vent pipe has more than one apparatus 72 attached to it there will be a second valve 41b attached at a second location of fan box 61. Thus, all legs of the vent line will run into the fan box 61. The second valve will further isolate the other lines of the vent pipe so as to create a better suction. Once the vent pipe is isolated, the exhaust system is then activated. The fan box creates a suction, thus causing the unpleasant odor from the toilet area to be extracted and expelled through the outlet of the vent pipe. In a preferred embodiment once the toilet is flushed the fan will be deactivated and the valves on the vent pipe will open, thus allowing for proper drainage. Once completed the sensor will reset and remain in a ready state until the next use, at which time the above procedure will be repeated. In the preferred embodiment the user may override the sensor system and control the odor removal system in a manual mode.

As various changes could be made in the above constructions without departing from the scope of the invention, it is intended that all matter contained in the above description shall be interpreted as illustrative and not in a limiting sense. In the view above it will be seen that several objects of the invention are achieved and other advantageous results attained.

I claim:

1. A vent system, for removing odorous air proximate to one or more toilets while in use, and for simultaneously being able to prevent water overflowing from said one or more toilets by accommodating draining of ascending water, in a backed up one of said one or more toilets, through a portion of said system, said vent system comprising:

one or more toilets, each of said one or more toilets comprising a rim, said rim comprising a generally circumferential surface that conforms to the shape of a top surface of a bowl portion of each of said one or more toilets, said rim being selectively connected to receive water from a water tank and to transport odorous air away; said water being deliverable to said bowl portion from said tank by flowing out from a first plurality of orifices of said rim and into said bowl portion, said first plurality of orifices being on at least a lower portion of said rim; said rim comprising a second plurality of orifices on at least an upper portion of said rim, said second plurality of orifices selectively permitting inward flow of air from said toilet into said rim, with said rim air exiting through a rim outlet; each of said second plurality of apertures comprising apertures being formed to be substantially larger than each of said first plurality of apertures, and said second plurality of apertures being equally spaced about said upper portion of said rim;

a vent pipe, said vent pipe generally being vertically disposed, said rim outlet being coupled to said vent pipe using a P-trap, said vent pipe having an upper portion inclining upward from said P-trap for venting and a lower portion declining downward from said P-trap to a sewage line, at least a portion of said P-trap being fillable with water to prevent said odorous air from returning through said vent pipe back to said toilet; said system comprising a self-regulating water fill means for maintaining said water in said rim-outlet-to-vent-pipe P-trap after said ventilation ceases;

a fan box, said vent pipe upper portion for each of said one or more toilets being coupled to said fan box, said fan box comprising a respective isolation valve for each of said one or more toilets; and a respective sensor at each of said one or more toilets, each of said respective sensors being capable of activating said fan box when triggered by a user, said activated fan box causing said respective isolation valve to close for each of said one or more toilets except for said used toilet, each of said closed respective isolation valves closing off said air flow therein, and permitting suction created by said fan box to extract said odorous air from said used toilet through at least said second plurality of rim orifices of said used toilet, and through said rim to said vent pipe upper portion; said odorous air being expelled out of a fan box outlet pipe; and wherein when a water level in said toilet ascends in said bowl portion due to said toilet being backed up, said first plurality of rim orifices and said second plurality of rim orifices receive said ascending water to permit said ascending water to drain through said P-trap and down said lower portion of said vent pipe to prevent overflowing of said rim by said rising water; said larger second plurality of orifices being capable of receiving waste water of said backed-up toilet; and wherein when said sensor triggers said fan box to deactivate, said sensor causes said closed respective isolation valves to open.

2. The vent system of claim 1 wherein said sensor comprises a pressure sensor.

* * * * *